(No Model.)
W. WALTER.
ADJUSTABLE STONE SAW SASH.
No. 361,033. Patented Apr. 12, 1887.
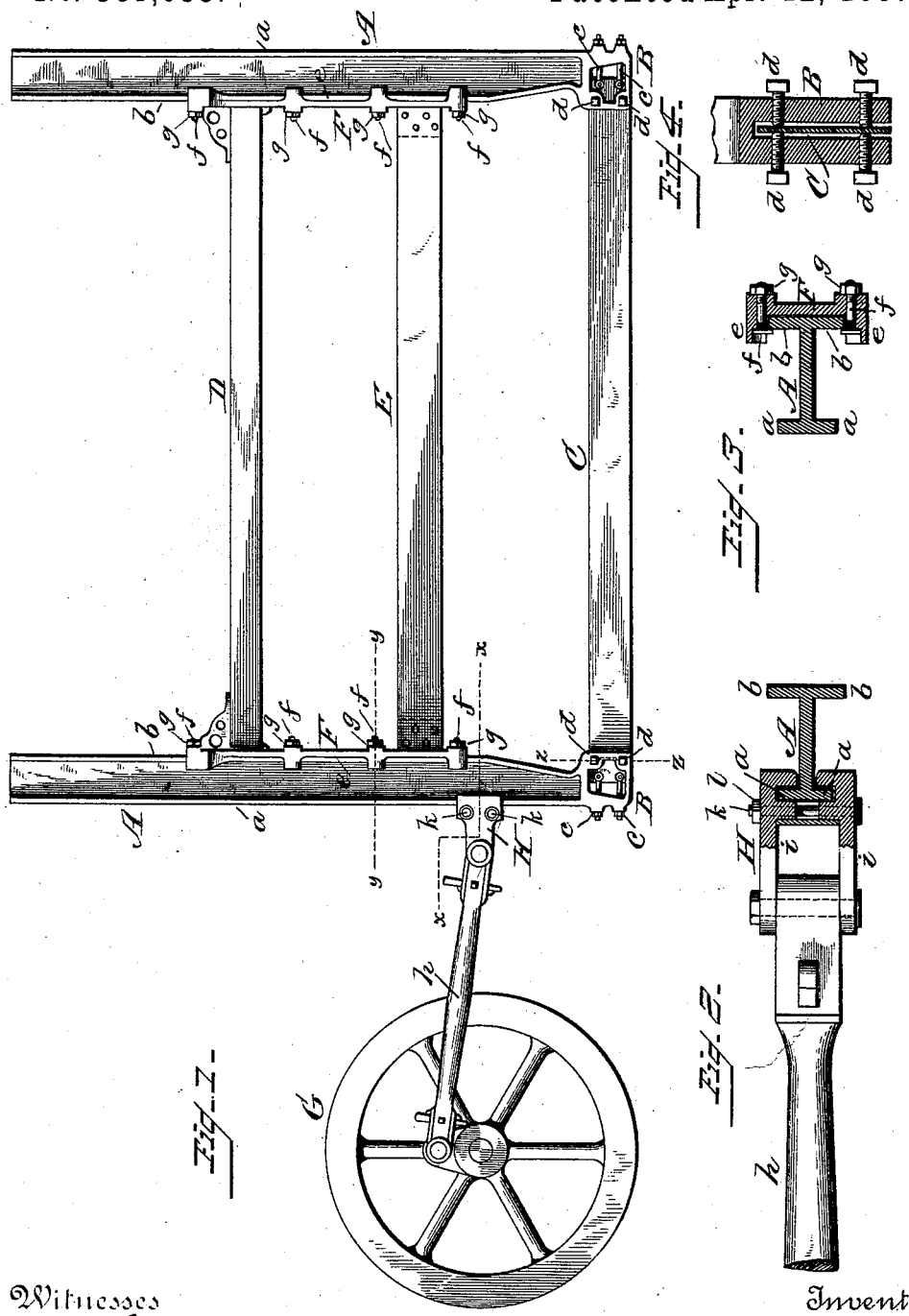
Witnesses
Inventor
Wright Walter.
By his Attorney Chas. H. Fowler

UNITED STATES PATENT OFFICE.

WRIGHT WALTER, OF NEW YORK, N. Y.

ADJUSTABLE STONE-SAW SASH.

SPECIFICATION forming part of Letters Patent No. 361,033, dated April 12, 1887.

Application filed November 16, 1886. Serial No. 219,045. (No model.)

*To all whom it may concern:*

Be it known that I, WRIGHT WALTER, a citizen of the United States, residing at New York, in the county of New York and State of New York, have invented certain new and useful Improvements in Adjustable Stone-Saw Sashes; and I do hereby declare that the following is a full, clear, and exact description of the same, reference being had to the annexed drawings, making a part of this specification, and to the letters and figures of reference marked thereon.

Figure 1 of the drawings is a side elevation of my invention; Fig. 2, a detail sectional view, on an enlarged scale, taken on line $x\ x$ of Fig. 1; Fig. 3, a similar view taken on line $y\ y$, and Fig. 4 a detail sectional view taken on line $z\ z$.

The present invention has relation to that class of saws for cutting stone which has imparted to it a reciprocating motion through the medium of suitable machinery; and it consists in certain details of construction, substantially as shown in the drawings, and hereinafter described and claimed.

In the accompanying drawings, A represents the two side bars of the saw-frame, formed of metal, preferably of the shape shown in cross-section, Figs. 2 and 3—that is to say, upon each side of the bar are flanges $a\ b$—and terminate at their lower extremities in slotted heads B, as shown more clearly in Fig. 4.

In the slot of the heads B extend the extremities of the saw-blade C, provided with the usual tightening-bolts, $c$, which are attached at one end to the extremities of the saw-blade and pass loosely through holes in the heads, said bolts having screw-threads upon their outer ends, upon which engage suitable nuts for taking up any slack in the blade. Any well-known means may be employed for attaining this result, as I do not wish to be confined to the means shown.

Extending transversely through the heads B are set-screws $d$, the inner ends thereof bearing against the sides of the saw-blade C, by which means the blade can be set at any angle from a perpendicular, and firmly held in such position by the set-screws above described, and as circumstances require. The side bars, A, are connected together above the saw-blade by means of braces D E, which extend parallel to each other and are suitably connected to brackets F. These brackets are formed with flanges $e$, which overlap the flanges $b$ on the side bars, A, and the brackets are held thereto by means of headed bolts $f$ and nuts $g$ engaging with the screw-threaded ends thereof, by which means the brackets may be adjusted vertically on the bars to admit of the saw-blade making any depth of cut desired.

The saw-frame is connected to the crank-wheel G by means of the crank-arm $h$, the latter being suitably pivoted to a block or clutch, H. This clutch consists of two inwardly-flanged plates, $i$, as shown in Fig. 2, the flanges overlapping the flanges $a$ of the side bars, A, and firmly clamped thereto by means of the screw-bolts $k$ and nuts $l$. By loosening the screw-bolts the clutch H may be adjusted vertically on the side bar, A, and fastened in its adjusted position by the nuts on the bolt, thereby keeping the point of attachment of the crank-arm $h$ with the side bar, A, level with the crank-center, thus avoiding having a long crank-arm or pitman connection.

So far as concerns the means employed for rendering the saw-blade and the clutch adjustable, the brackets F and braces D E may be dispensed with, and any suitable devices or means may be employed for holding and bracing the side bars, A, either constructed of wood or metal, as preferred.

Having now fully described my invention, what I claim as new, and desire to secure by Letters Patent, is—

1. In a saw for sawing stone, the combination, with the slotted side bars of the saw-frame and the saw-blade, of set-screws extending through the slotted portion of the bars and bearing against the blade at both top and bottom, whereby said blade may be adjusted sidewise or laterally to vary the angle of the blade from a perpendicular and held in its adjusted position by means of the set-screws, substantially as and for the purpose set forth.

2. In a mill for sawing stone, the brackets adjustable upon the side bars of the saw-frame and having connected thereto suitable braces, in combination with the saw-blade and a pitman-clutch, also connected to and vertically adjustable on the saw-frame, substantially as and for the purpose specified.

In testimony that I claim the above I have hereunto subscribed my name in the presence of two witnesses.

WRIGHT WALTER.

Witnesses:
SAML. D. TORRENCE,
J. L. HEWLETT.